April 11, 1950     A. C. MORRISON     2,504,036
COMBUSTION CHAMBER FOR INTERNAL-COMBUSTION ENGINES
Filed Nov. 1, 1946     2 Sheets-Sheet 1
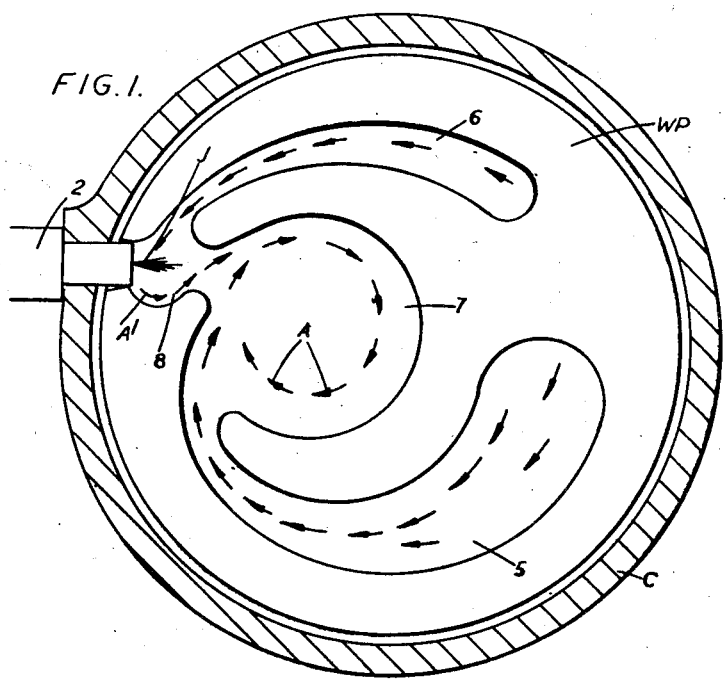
Inventor
Alfred C. Morrison
By
Agent.

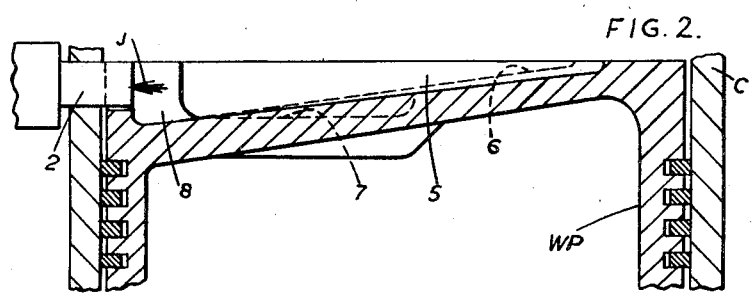
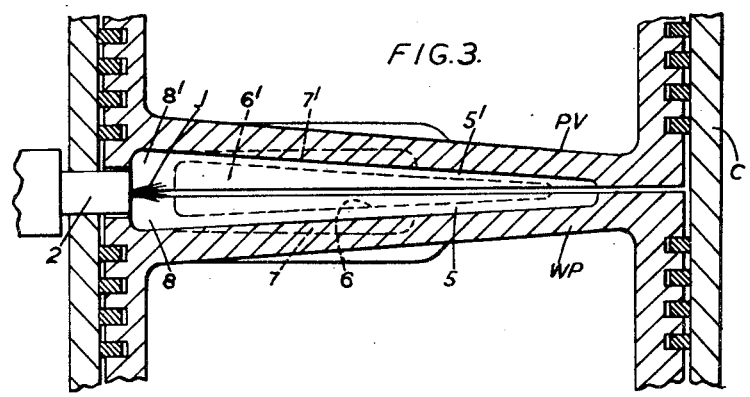
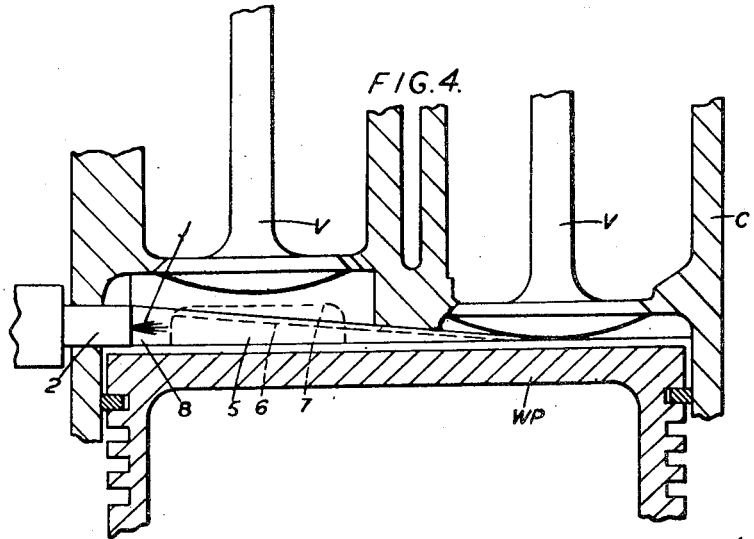

Patented Apr. 11, 1950

2,504,036

UNITED STATES PATENT OFFICE 2,504,036

COMBUSTION CHAMBER FOR INTERNAL-COMBUSTION ENGINES

Alfred Charles Morrison, Quorn, England

Application November 1, 1946, Serial No. 707,197
In Great Britain August 24, 1945

Section 1, Public Law 690, August 8, 1946
Patent expires August 24, 1965

3 Claims. (Cl. 123—32)

This invention relates to internal combustion engines, and has reference particularly to the combustion chambers of compression ignition oil, e. g. Diesel, engines in which the fuel is sprayed into a compressed charge of air, ignition resulting from the heat of compression and requiring no extraneous device.

When adopting air and solid fuel injection it is usually desirable to cause the air in the cylinder to rotate or "swirl" in order effectively to burn the fuel. Moreover, by directing this swirl either towards or across the injecting fuel easy starting is obtained, although this is usually accompanied by a pronounced knock. By causing the air to swirl in the same direction as the injecting fuel, bad starting results although in this instance the engine runs quietly and is of good efficiency. This phenomena is probably caused by the air friction on the fuel globules causing skin heating on the latter and raising the fuel skin temperature.

With a view to combining the aforesaid advantages while at the same time minimizing the specified disadvantages it has previously been proposed to provide a compression ignition engine wherein, on compression, air admitted into the or each combustion chamber is caused to rotate or swirl and the fuel jet in the associated cylinder is projected in the direction of the rotating or swirling air and wherein, moreover, simultaneously upon rotation of the main body of the admitted air, a subsidiary and smaller body of swirling air is directed into the main swirl in the direction of the latter, the fuel jet crossing and passing through the subsidiary swirl so that burning particles at a high temperature produced as a consequence of initial combustion within the subsidiary swirl are swept into the main swirl where combustion is completed.

The object of the present invention is to provide improvements in a compression ignition engine of this particular form, as will be hereinafter described.

According to this invention a compression ignition engine of the form referred to is characterized in that the crown of the working piston in the or each cylinder and/or the opposing face of either a piston valve in the cylinder head or the said head itself is or are formed with depressions or grooves appropriately contoured for the purpose of producing the main and subsidiary air swirls.

The invention is applicable to engines furnished with poppet valves as well as to those having piston valves in the heads of the cylinders.

The invention may be applied, moreover, both to two and four stroke engines and even to six stroke engines including cooling strokes.

It is also applicable to engines of the uniflow type, i. e. two cycle engines in which air is drawn in through overhead valves of the poppet or piston type and the exhaust of the burnt gases is by way of ports disposed at the bottom of the piston stroke, as well as to engines of the inverted uniflow type in which air is drawn in at the bottom of this piston stroke and exhaust is through poppet or piston valves in the cylinder head.

In order that the invention may be more clearly understood and readily carried into practical effect, specific constructional examples thereof as applied to Diesel engines will now be described with reference to the accompanying purely diagrammatic drawings, wherein, Figures 1 and 2 are part sectional plan and vertical sectional views respectively of a cylinder and piston showing the manner in which the invention is carried out by grooving the crown of the piston, Figure 3 is a further vertical sectional view of a modification in which both the crown of the main piston and the opposed end of a piston valve are grooved for the purpose in view, and Figure 4 is a still further vertical sectional view of an arrangement in which the cylinder head alone is grooved to achieve the object of the invention.

Like parts are designated by similar reference characters throughout the drawings.

In Figures 1 and 2 combustion occurs entirely within the cylinder C, the required motions being imparted both to the main and to the subsidiary air by appropriately shaped depressions or grooves formed in the crown of the working piston WP. Thus, in this particular example, the fuel nozzle 2 projects directly into the combustion chamber within the cylinder, and the piston crown is formed with curved depressions 5 and 6 each of tapering depth. The larger depression 5 for the main air narrows as it deepens and leads into a substantially circular combustion pocket 7 in which the larger proportion of the compressed charge of air is caused to rotate or swirl (see arrows A). The smaller depression 6 for the subsidiary air also narrows as it deepens and leads into a much smaller pocket 8 arranged in communication with the main pocket 7. The subsidiary air is accordingly spun across the fuel jet J (arrows A¹) after which it joins the main stream of the rotating air.

Where, however, such an engine is furnished with a piston valve, then the crown of the said valve, in addition to the opposing crown of the working piston WP, may be formed with similarly curved and tapered depressions and pockets. This is illustrated in Figure 3 in which it will be seen that the piston valve PV is formed with depressions 5¹ and 6¹ and with main and subsidiary combustion pockets 7¹ and 8¹ respectively.

A somewhat similar construction may be adopted in a poppet valve engine by forming tapered depressions and pockets, again like those shown in Figure 1, in the cylinder head alone (see Figure 4).

In a modification, a main air depression and pocket may be formed in the cylinder and an associated subsidiary depression and pocket in the crown of the working piston, or vice versa. That is to say, for instance, it is not essential to form the depressions 5 and 6 aforesaid in the same part.

In the examples, the proportion of the subsidiary air may vary from, say, 5% in a very large engine to 15% in a small bore engine.

The fuel, due to the cross action of the subsidiary swirl is heated and includes burning particles on the surface which act as a "pilot torch" to ignite the main body of the compression charge of air.

By the means described easy starting with the initial combustion is achieved, this taking place with air swirling into or across the fuel jet, and the power combustion taking place by the said jet—with the burning initial swirl driving in the power swirl in the direction of its rotation.

What I claim then is:

1. In a compression ignition engine, a cylinder having provision for the admission thereinto of a charge of air, a fuel nozzle extending through the wall of the cylinder, and a working piston reciprocable in said cylinder, the crown of the piston having therein for the collection of air a curved depression of tapering depth which narrows as it deepens, a substantially circular combustion pocket with which the free end of said depression merges, a second curved depression of tapering depth of lesser dimensions than the first mentioned depression in said crown, a subsidiary pocket in said crown adjacent said fuel nozzle with which the free end of said second mentioned depression merges, an entrance between the circular pocket and the subsidiary pocket intermediate the free ends of said depressions and the said pockets whereby on a compression stroke of the working piston the main body of the compressed charge of air is caused to rotate while at the same time a subsidiary body of swirling air is directed into the main body in the direction of the main body of the air so that the fuel jet passes through the subsidiary body whereby the products of initial combustion are swept into the main body of air for complete combustion.

2. In a compression ignition engine, a cylinder, a piston valve adapted to work in the head of the cylinder for controlling the admission of a charge of air, a fuel nozzle extending through the wall of said cylinder, and a working piston reciprocable within the cylinder, the crown of said piston and the opposing face of the piston valve each having therein for the collection of air a curved depression of tapering depth which narrows as it deepens, a substantially circular combustion pocket with which the free end of said depression merges, a second curved depression of tapering depth of lesser dimensions than the first mentioned depression in said crown a subsidiary pocket adjacent said fuel nozzle with which the free end of said second mentioned depression merges, an entrance between the circular pocket and the subsidiary pocket intermediate the free ends of the said depressions and the said pockets whereby on a compression stroke of the working piston the main body of the compressed charge of air is caused to rotate while at the same time a subsidiary body of swirling air is directed into the main body in the direction of the main body of the air so that the fuel jet passes through the subsidiary body whereby the products of initial combustion are swept into the main body of air for complete combustion.

3. In a compression ignition engine, a cylinder having provision for the admission thereinto of a charge of air, a fuel nozzle extending through the wall of said cylinder, and a working piston reciprocable in the cylinder, the head of said cylinder having therein for the collection of air a curved depression of tapering depth which narrows as it deepens, a substantially circular combustion pocket with which the free end of said depression merges, a second curved depression of tapering depth of lesser dimensions than the first mentioned depression in said crown a subsidiary pocket in said crown adjacent said fuel nozzle with which the free end of said second mentioned depression merges, an entrance between the circular pocket and the subsidiary pocket intermediate the free ends of said depressions and said pockets whereby on a compression stroke of the working piston the main body of the compressed charge of air is caused to rotate while at the same time a subsidiary body of swirling air is directed into the main body in the direction of the main body of the air so that the fuel jet passes through the subsidiary body whereby the products of initial combustion are swept into the main body of air for complete combustion.

ALFRED CHARLES MORRISON.

REFERENCES CITED

The following references are of record in the file of this patent:

UNITED STATES PATENTS

| Number | Name | Date |
|---|---|---|
| 1,745,884 | Barnaby | Feb. 4, 1930 |
| 2,419,096 | Stickney | Apr. 15, 1947 |

FOREIGN PATENTS

| Number | Country | Date |
|---|---|---|
| 724,295 | France | Apr. 25, 1932 |

OTHER REFERENCES

Ser. No. 286,744, Leizaola (A. P. C.) published June 15, 1943.